US012175699B2

(12) United States Patent
Akutsu et al.

(10) Patent No.: US 12,175,699 B2
(45) Date of Patent: Dec. 24, 2024

(54) CONFIDENCE DETERMINATION OF 3D POINT CLOUD DATA ACQUIRED BY LIDAR SENSOR

(71) Applicant: NEC Corporation, Tokyo (JP)

(72) Inventors: Kenta Akutsu, Tokyo (JP); Junichi Funada, Tokyo (JP); Kazuyuki Kon, Tokyo (JP)

(73) Assignee: NEC CORPORATION, Tokyo (JP)

( * ) Notice: Subject to any disclaimer, the term of this patent is extended or adjusted under 35 U.S.C. 154(b) by 395 days.

(21) Appl. No.: 17/628,750

(22) PCT Filed: Jun. 19, 2020

(86) PCT No.: PCT/JP2020/024062
§ 371 (c)(1),
(2) Date: Jan. 20, 2022

(87) PCT Pub. No.: WO2021/014846
PCT Pub. Date: Jan. 28, 2021

(65) Prior Publication Data
US 2022/0270282 A1      Aug. 25, 2022

(30) Foreign Application Priority Data
Jul. 22, 2019   (JP) ................................ 2019-134718

(51) Int. Cl.
*G06K 9/00*   (2022.01)
*G01S 17/89*   (2020.01)
*G06T 7/70*   (2017.01)

(52) U.S. Cl.
CPC ................ *G06T 7/70* (2017.01); *G01S 17/89* (2013.01); *G06T 2207/10028* (2013.01); *G06T 2207/20084* (2013.01)

(58) Field of Classification Search
CPC . G06T 2207/10028; G06T 2207/30248; G06T 2207/30252; G06T 2207/30256;
(Continued)

(56) References Cited

U.S. PATENT DOCUMENTS 10,810,445 B1 *   10/2020   Kangaspunta ............ G06T 5/70
10,921,817 B1 *   2/2021   Kangaspunta ......... G06V 20/56
(Continued)

FOREIGN PATENT DOCUMENTS

EP         3506161 A1       7/2019
JP       2013-142991 A      7/2013
(Continued)

OTHER PUBLICATIONS

International Search Report for PCT Application No. PCT/JP2020/024062, mailed on Sep. 15, 2020.
(Continued)

*Primary Examiner* — Atiba O Fitzpatrick

(57) ABSTRACT

Provided is an information processing device capable of determining accuracy of data acquired using an LIDAR sensor.
An information processing device (10) according to the present disclosure includes: an image-capturing sensor (11); a learning unit (12) configured to learn, as learning data, learning image-capturing data and likelihood of a distance between points included in 3D point cloud data with correct answer in a region substantially the same region included in the learning image-capturing data, and to generate a learned model; and an estimation unit (13) configured to use the learned model to generate estimation data including likelihood of a distance between points included in estimation 3D point cloud data determined based on estimation image-capturing data, from the estimation image-capturing data acquired by the image-capturing sensor (11).

9 Claims, 9 Drawing Sheets

(58) Field of Classification Search
CPC ............. G06T 2207/30261; G06T 7/70; G06T 2207/20081; G06T 2207/20084; G06T 9/002; G06T 5/60; G06T 2207/30168; G01S 17/86; G06V 20/56; G06V 20/58; G06V 20/582; G06V 20/584; G06V 20/586; G06V 10/70; G06V 10/82; G06V 10/774–7796; G06V 10/454; G06K 9/6256; G06K 9/6257; G06K 9/6259; G06N 3/02–126; G06N 20/00–20; G06F 18/214–2155; G06F 7/023; G06F 40/16; G01N 29/4481

See application file for complete search history.

(56) References Cited

U.S. PATENT DOCUMENTS

| | | | | |
|---|---|---|---|---|
| 2015/0324658 | A1* | 11/2015 | Zhang | G06F 18/256 382/203 |
| 2017/0314930 | A1* | 11/2017 | Monterroza | G06N 3/049 |
| 2018/0284257 | A1 | 10/2018 | Sutou et al. | |
| 2018/0300560 | A1* | 10/2018 | Westerhoff | G06N 7/00 |
| 2018/0373942 | A1 | 12/2018 | Noda et al. | |
| 2019/0096086 | A1* | 3/2019 | Xu | G06V 20/647 |
| 2019/0325595 | A1* | 10/2019 | Stein | G06T 7/248 |
| 2019/0340775 | A1* | 11/2019 | Lee | G06T 7/521 |
| 2020/0175720 | A1* | 6/2020 | Hsu | H04N 13/293 |
| 2020/0272816 | A1* | 8/2020 | Endres | G06V 10/945 |
| 2020/0333466 | A1* | 10/2020 | Hansen | G01S 17/08 |
| 2020/0410259 | A1* | 12/2020 | Srinivasan | G06F 17/18 |
| 2022/0277515 | A1* | 9/2022 | Chandler | G06T 5/70 |

FOREIGN PATENT DOCUMENTS

| | | |
|---|---|---|
| JP | 2019-008460 A | 1/2019 |
| WO | 2017/057061 A1 | 4/2017 |

OTHER PUBLICATIONS

EP Office Action for EP Application No. 20843522.2, mailed on May 7, 2024.

* cited by examiner

CONFIDENCE DETERMINATION OF 3D POINT CLOUD DATA ACQUIRED BY LIDAR SENSOR This application is a National Stage Entry of PCT/JP2020/024062 filed on Jun. 19, 2020, which claims priority from Japanese Patent Application 2019-134718 filed on Jul. 22, 2019, the contents of all of which are incorporated herein by reference, in their entirety.

TECHNICAL FIELD

The present disclosure relates to an information processing device, a data generation method, and a program.

BACKGROUND ART

A three-dimensional LIDAR (Light Detection and Ranging) sensor is a sensor used to acquire information on surrounding environments including a shape. The three-dimensional LIDAR sensor is used for automated driving control or robot control, for example. In the automated driving control, the three-dimensional LIDAR sensor is used to acquire information on obstacles around a vehicle or road surfaces.

Patent Literature 1 discloses a technique for measuring a distance to an object such as another vehicle or a pedestrian using an LIDAR sensor mounted on a vehicle.

CITATION LIST

Patent Literature

Patent Literature 1: Japanese Unexamined Patent Application Publication No 2019-8460

SUMMARY OF INVENTION

Technical Problem

A three-dimensional LIDAR sensor including an LIDAR sensor disclosed in Patent Literature 1 detects reflected light of light irradiated to the surroundings to measure a distance to a target object which is irradiated with the light. Further, the three-dimensional LIDAR sensor acquires a shape of a surrounding object or information on surrounding environments by collectively retaining distance information as point cloud data for each measurement point. However, the three-dimensional LIDAR sensor may not be able to normally detect the reflected light of the irradiated light due to a nature of utilizing the reflection of light. For example, when an incident angle of the light with which the objected is irradiated is shallow, or when a material with low reflection intensity or a puddle in which light is totally reflected is irradiated with light, the intensity of the reflected light received by the three-dimensional LIDAR sensor is weakened. In such a case, a problem is that the point cloud data acquired by the three-dimensional LIDAR sensor includes data with low confidence due to a defect or the like.

An object of the present disclosure is to provide an information processing device, a data generation method, and a program that can determine accuracy of data acquired using an LIDAR sensor.

Solution to Problem

An information processing device according to a first aspect of the present disclosure includes: an image-capturing sensor; a learning unit configured to learn, as learning data, learning image-capturing data and likelihood of a distance between points included in 3D (three-dimensional) point cloud data with correct answer in a region substantially the same region included in the learning image-capturing data, and to generate a learned model; and an estimation unit configured to use the learned model to generate estimation data including likelihood of a distance between points included in estimation 3D point cloud data determined based on estimation image-capturing data, from the estimation image-capturing data acquired by the image-capturing sensor.

A data generation method according to a second aspect of the present disclosure includes: learning, as learning data, learning image-capturing data and likelihood of a distance between points included in 3D point cloud data with correct answer in a region substantially the same region included in the learning image-capturing data, and generating a learned model; and using the learned model to generate estimation data including likelihood of a distance between points included in estimation 3D point cloud data determined based on estimation image-capturing data, from the estimation image-capturing data acquired by the image-capturing sensor.

A program according to a third aspect of the present disclosure causes a computer to execute: a process of learning, as learning data, learning image-capturing data and likelihood of a distance between points included in 3D point cloud data with correct answer in a region substantially the same region included in the learning image-capturing data, and generating a learned model; and a process of using the learned model to generate estimation data including likelihood of a distance between points included in estimation 3D point cloud data determined based on estimation image-capturing data, from the estimation image-capturing data acquired by the image-capturing sensor.

Advantageous Effects of Invention

According to the present disclosure, it is possible to provide an information processing device, a data generation method, and a program that can determine accuracy of data acquired using an LIDAR sensor.

DESCRIPTION OF EMBODIMENTS

First Example Embodiment

Figure 1:
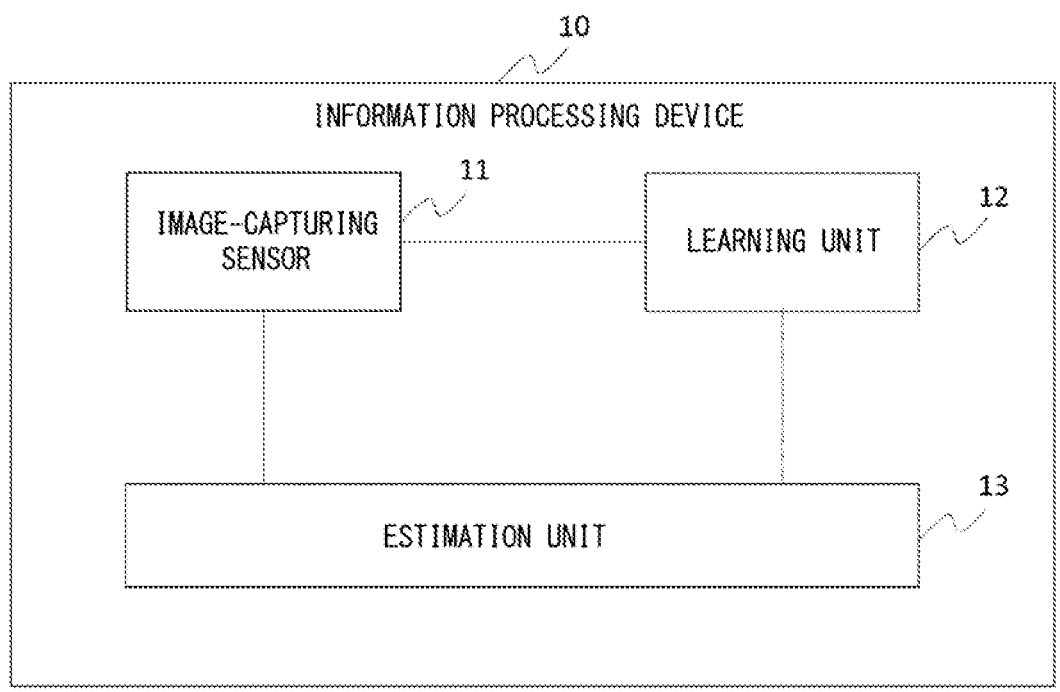
FIG. 1 is a block diagram of an information processing device according to a first example embodiment.

Example embodiments of the present invention will be described below with reference to the drawings. A configuration example of an information processing device 10 according to a first example embodiment will be described with reference to FIG. 1. The information processing device 10 may be a computer device that operates when a processor executes a program stored in a memory.

The information processing device 10 includes an image-capturing sensor 11, a learning unit 12, and an estimation unit 13. The image-capturing sensor 11 generates image-capturing data of an object to be captured or an area to be captured. The image-capturing data may be referred to as image data. The image-capturing sensor 11 may be a sensor, for example, a visible light camera, a depth camera, an infrared camera, or a multispectral camera that acquires image data. Further, the image-capturing sensor 11 may be configured using a single camera or a plurality of cameras. The image-capturing sensor 11 may be referred to as an imaging sensor, an image sensor, or an image-capturing device, for example.

The learning unit 12 and the estimation unit 13 may be software or modules to be processed when a processor executes a program stored in a memory. Alternatively, the learning unit 12 and the estimation unit 13 may be hardware such as a circuit or a chip.

The image-capturing sensor 11 generates learning image-capturing data and estimation image-capturing data. The learning image-capturing data is data used as input data or learning data of a model used for machine learning. The estimation image-capturing data is used to estimate likelihood of a distance of estimation 3D point cloud data corresponding to a specific region in the estimation image-capturing data. The estimation 3D point cloud data is 3D point cloud data associated with a region or a pixel included in the estimation image-capturing data. In other words, the estimation 3D point cloud data is 3D point cloud data determined based on the region or the pixel included in the estimation image-capturing data. Each of the learning image-capturing data and the estimation image-capturing data is image data including an object or a landscape, for example.

The learning unit 12 learns learning image-capturing data and likelihood of a distance between points included in 3D point cloud data with correct answer in a region substantially the same as the region included in the learning image-capturing data as learning data, and generates a learned model. The 3D point cloud data with correct answer in the region substantially the same as the region included in the learning image-capturing data may be data in which likelihood of each point is given to 3D point cloud data in which the information in the same region as the region captured using the image-capturing sensor is generated using a sensor different from the image-capturing sensor. The sensor different from the image-capturing sensor may be, for example, a distance measurement sensor. The distance measurement sensor may be, for example, an LIDAR sensor or a three-dimensional LIDAR sensor. The 3D point cloud data may be, for example, data indicating a distance from the distance measurement sensor to each point included in the 3D point cloud data and a direction of each point with the distance measurement sensor as a base point.

The 3D point cloud data with correct answer in the region substantially the same as the region included in the learning image-capturing data include, for example, data of a stationary object such as a real estimate, a road, or a plant included in the learning image-capturing data or data of an object with a small motion. Here, the 3D point cloud data with correct answer may have substantially the same region as the region included in the learning image-capturing data, and may be acquired at substantially the same timing as the learning image-capturing data. In this case, the 3D point cloud data with correct answer may include data, which is included in the learning image-capturing data, of the same object as a moving object of a person or a car in addition to the stationary object or the object with a small motion.

The 3D point cloud data with correct answer may be generated using, for example, a distance measurement sensor built in or attached to the information processing device 10. Alternatively, the 3D point cloud data with correct answer may be data generated by a device different from the information processing device 10. In this case, the information processing device 10 may acquire the data generated by the device different from the information processing device 10 via a network. Alternatively, the information processing device 10 may acquire the data generated by the device different from the information processing device 10 via a recording medium, for example.

The learned model may be, for example, a model to which parameters determined by learning the learning image-capturing data and the likelihood of the distance between the points included in the 3D point cloud data with correct answer are applied. In other words, the learning unit 12 determines parameters of the model by learning the learning image-capturing data and the likelihood of the distance between the points included in the 3D point cloud data with correct answer. The learning may be, for example, machine learning or deep learning using a convolutional neural network.

The estimation unit 13 uses the learning model generated by the learning unit 12 to generate estimation data including the likelihood of the distance between the points included in the estimation 3D point cloud data, from the estimation image-capturing data acquired by the image-capturing sensor 11.

The learning unit 12 uses, as correct answer data, the likelihood of the distance between the points included in the 3D point cloud data with correct answer. It is assumed that each point included in the 3D point cloud data with correct answer is associated with the region or the pixel included in the learning image-capturing data. In this case, the estimation unit 13 inputs the estimation image-capturing data acquired by the image-capturing sensor 11 to the learning model generated by the learning unit 12, thereby outputting the likelihood of the distance between the points included in the estimation 3D point cloud data. The data output from the learning model corresponds to the estimation data.

As described above, the information processing device 10 can generate the estimation data including the likelihood of the distance between the points associated with the region or the pixel included in the estimation image-capturing data acquired by the image-capturing sensor 11. The likelihood of the distance between the points estimated in this way are associated with the points included in the point cloud data actually measured using the LIDAR sensor, whereby the accuracy of the data measured using the LIDAR sensor can be determined.

In the above description, the configuration has been described in which the information processing device 10 includes the image-capturing sensor 11 and the learning unit 12, but at least one of the image-capturing sensor 11 and the learning unit 12 may be provided in a device different from the information processing device 10.

For example, the image-capturing sensor 11 may be provided in a car or the like. Data acquired by the image-capturing sensor 11 provided in the car may be recorded in a recording device in the information processing device 10, or may be retained in a device different from the information processing device 10. The recording device may be an SSD (Solid State Drive) or an HDD (Hard Disk Drive), for example.

Further, a device (hereinafter, referred to as a learning device) including the learning unit 12 and different from the information processing device 10 may perform learning using the data recorded in the recording device and may generate a learned model. The information processing device 10 can use the learned model generated by the learning device to perform desired information processing.

As described above, when the learning unit 12 is provided in the learning device different from the information processing device 10, a processing load of the information processing device 10 can be reduced.

Second Example Embodiment

Figure 2:
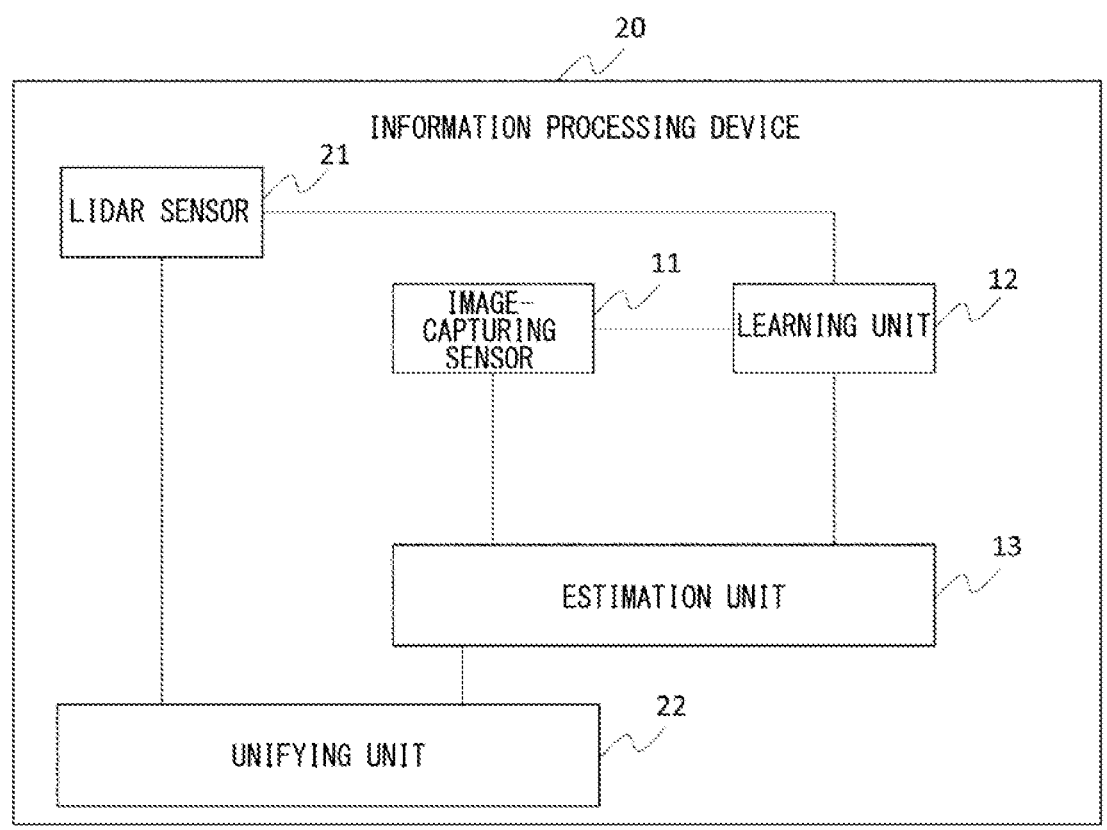
FIG. 2 is a block diagram of an information processing device according to a second example embodiment.

Subsequently, a configuration example of an information processing device 20 according to a second example embodiment will be described with reference to FIG. 2. The information processing device 20 includes an image-capturing sensor 11, a learning unit 12, an estimation unit 13, a LIDAR sensor 21, and a unifying unit 22. The image-capturing sensor 11, the learning unit 12, and the estimation unit 13 are the same as the image-capturing sensor 11, the learning unit 12, and the estimation unit 13 in FIG. 1, and will not be described in detail. The components constituting the information processing device 20 may be software or modules to be executed when a processor executes a program stored in a memory. Alternatively, the components may be hardware such as circuits or chips.

The LIDAR sensor 21 acquires learning 3D point cloud data and measurement 3D point cloud data. Acquiring may be referred to as measuring, collecting, or generating. A region of the learning 3D point cloud data includes a region of image data generated by the learning image-capturing data. The LIDAR sensor 21 is attached to the information processing device 20 and is attached to a position where point cloud data including a region capable of being captured using the image-capturing sensor 11 can be acquired. Alternatively, the LIDAR sensor 21 may be attached to the same object as the object to which the image-capturing sensor 11 is attached. The object to which the image-capturing sensor 11 is attached mat be a wall, a stick, or a building, for example. In other words, the LIDAR sensor 21 and the image-capturing sensor 11 may be attached to a device or place different from the information processing device 20. In this case, the LIDAR sensor 21 and the image-capturing sensor 11 may be connected to the information processing device 20 via a cable. Alternatively, the LIDAR sensor 21 and the image-capturing sensor 11 may be connected to the information processing device 20 via a wireless line.

The LIDAR sensor 21 outputs the acquired learning 3D point cloud data to the learning unit 12. In addition, the LIDAR sensor 21 outputs the acquired measurement 3D point cloud data to the unifying unit 22. The estimation 3D point cloud data is 3D point cloud data determined based on the region or the pixel included in the estimation image-capturing data, whereas the measurement 3D point cloud data is 3D point cloud data actually measured using the LIDAR sensor 21. Here, a learning process executed in the learning unit 12 will be described with reference to FIG. 3.

The learning unit 12 uses, as learning data, learning image-capturing data and 3D point cloud data with correct answer. In the 3D point cloud data with correct answer, likelihood of each point of the learning 3D point cloud data acquired by the LIDAR sensor 21 is given as correct answer data. The likelihood of the point may be, for example, likelihood of a distance from the LIDAR sensor 21 to the target object. For example, the likelihood is set to a value of 1 as correct answer data at a point where the distance can be measured. At a point where the distance cannot be measured, or at a point where the distance measurement result is discontinuous or isolated compared to the measurement result of surrounding points, the likelihood is set to a value of 0 as correct answer data. The discontinuous point or the isolated point may be, for example, a point where the difference from the distance indicated by the surrounding points may be larger than a predetermined threshold value. Further, depending on the degree of accuracy or inaccuracy of the likelihood, the likelihood may be given a value between 0 to 1. For example, the likelihood may be set to a value of 1 as correct answer data at the point where the distance can be measured, the likelihood may be set to a value of 0 at the point where the distance cannot be measured, and the likelihood may be given a value between 0 to 1 at the point where the distance measurement result is discontinuous or isolated compared to the measurement result of surrounding points. In this case, the accuracy increases as the likelihood value is closer to 1 from 0.

An example of the case where the distance cannot be measured may include a case where the light irradiated from the LIDAR sensor 21 is totally reflected and the reflected light cannot be detected by the LIDAR sensor 21. The point where the distance cannot be measured is assumed to indicate a puddle, for example. Further, it is assumed that the point where the distance measurement result is discontinuous or isolated compared to the measurement result of surrounding points indicates the reflected light reflected by rain or snow. Alternatively, the likelihood of each point may be set by visual observation of a human. For example, by the visual observation of the human, the likelihood may be set to a value of 0 at a point corresponding to the position of the puddle where total reflection is likely to occur, and the likelihood may be set to a value of 1 at a point corresponding to a place where total reflection does not occur. Alternatively, the likelihood of each point may be set by matching precise 3D structure information such as a dynamic map or map data with the 3D point cloud data with correct answer.

Figure 3:
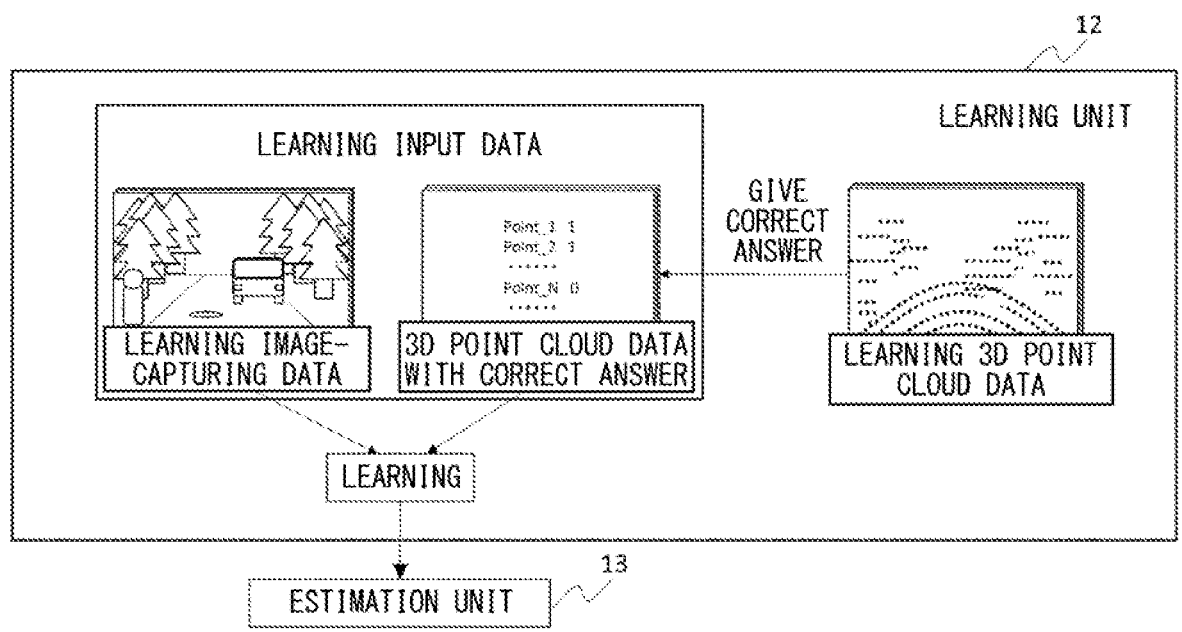
FIG. 3 is a view illustrating an outline of a learning process according to the second example embodiment.

Point_1 to Point_N disclosed in the 3D point cloud data with correct answer in FIG. 3 indicate respective points and are associated with the image-capturing data. For example, the position of each pixel in the image-capturing data may be associated with each point in the 3D point cloud data with correct answer.

The learning unit 12 determines parameters of a model used for estimating the likelihood of each point in the estimation 3D point cloud data determined based on the region or pixel included in the estimation image-capturing data. The learning unit 12 performs learning using the learning image-capturing data and the 3D point cloud data with correct answer as learning data in order to determine the parameters. The model in which the parameters are determined may be referred to as a learned model. The parameters may be a weighting coefficient and the like used in deep learning.

The learning unit 12 outputs the learned model to the estimation unit 13. Alternatively, the estimation unit 13 may acquire the learned model from the learning unit 12 each time the estimating process is executed.

Returning to FIG. 2, the estimation unit 13 generates point cloud likelihood estimation data including the likelihood of the distance between the points in the estimation 3D point cloud data determined based on the region or pixel included in the estimation image-capturing data acquired by the image-capturing sensor 11. The point cloud likelihood estimation data may be associated with the likelihood of each point and the estimated distance between the points, for example, as shown in the 3D point cloud data with correct answer in FIG. 3.

Figure 4:
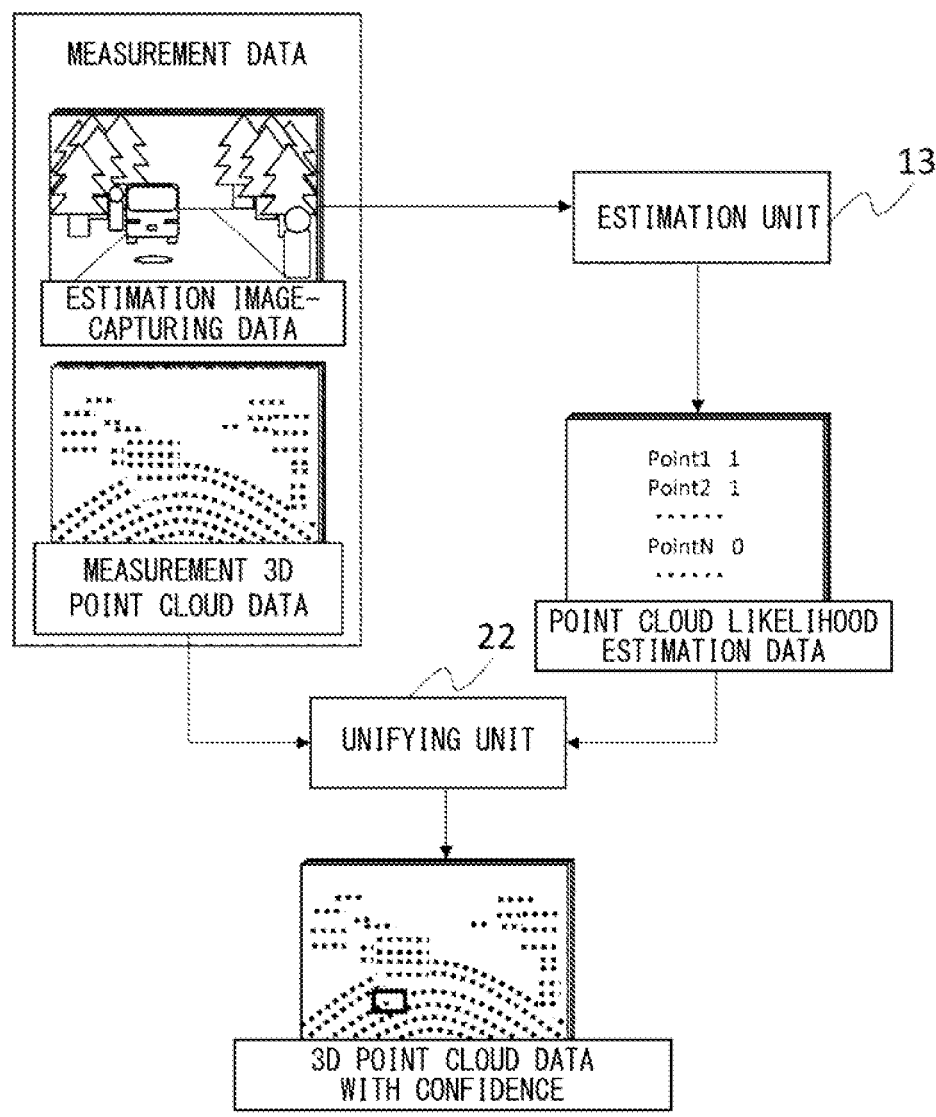
FIG. 4 is a view illustrating an outline of a unifying process according to the second example embodiment.

A unifying process executed in the unifying unit 22 will be described herein with reference to FIG. 4. The unifying unit 22 receives the measurement 3D point cloud data acquired by the LIDAR sensor 21 and the point cloud likelihood estimation data generated by the estimation unit 13. Measurement 3D point cloud data included in measurement data of FIG. 4 is acquired by the LIDAR sensor 21, and estimation image-capturing data is acquired by the image-capturing sensor 11. The unifying unit 22 gives the likelihood of each point shown in the point cloud likelihood estimation data to each point in the measurement 3D point cloud data, and generates 3D point cloud data with confidence.

The 3D point cloud data with confidence may be, for example, point cloud data in which the likelihood is 0, that is, the point where the accuracy of the data is assumed to be low is clearly distinguished. The low data accuracy may be referred to as low data confidence. For example, in the 3D point cloud data with confidence, the point with low data accuracy may be surrounded by a figure such as a square. Alternatively, the 3D point cloud data with confidence may be given, as a color of the point with low data accuracy, a color different from the color of the point with high data accuracy. In other words, the 3D point cloud data with confidence may be generated such that the point with the likelihood lower than 1 can be distinguished from the point with the likelihood of 1 or more when the threshold value of the likelihood is 1. The 3D point cloud data with confidence may be used as display data.

Figure 5:
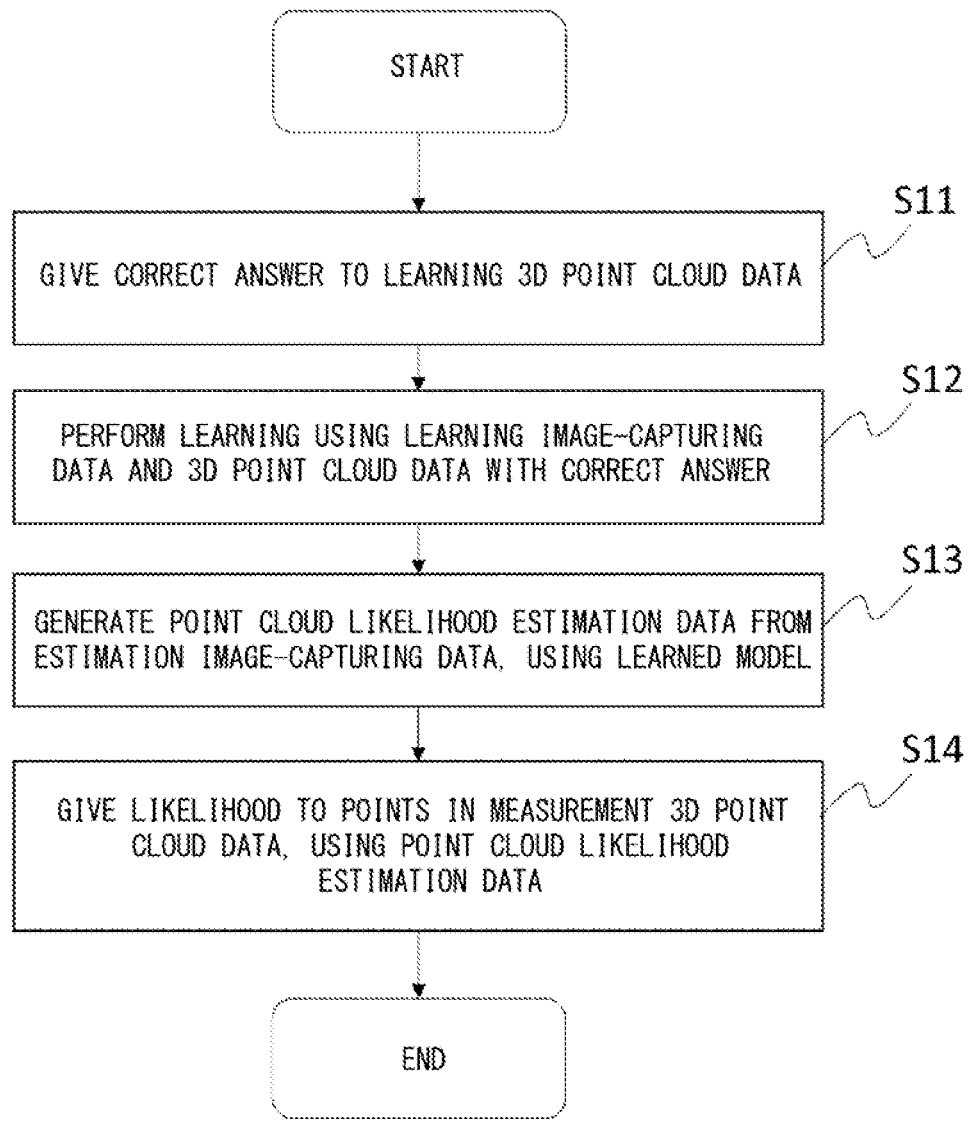
FIG. 5 is a view showing a flow of a generating process of a 3D point cloud data with confidence according to the second example embodiment.

Subsequently, a flow of a generating process of the 3D point cloud data with confidence executed in the information processing device 20 will be described with reference to FIG. 5.

First, the learning unit 12 gives or sets the likelihood of the distance as correct answer data to respective points included in the learning 3D point cloud data (S11). Alternatively, the learning unit 12 may acquire the 3D point cloud data with correct answer to which the likelihood is given as the correct answer data, from another functional block or another device different from the information processing device 20.

Next, the learning unit 12 performs learning using the learning image-capturing data and the 3D point cloud data with correct answer as input data (S12). The learning unit 12 performs learning to determine the parameters of the model used to estimate the likelihood of each point in the estimation 3D point cloud data determined based on the region or pixel included in the estimation image-capturing data.

Next, the estimation unit 13 uses the learned model to generate point cloud likelihood estimation data, in which the likelihood of each point included in the point cloud data is estimated, from the estimation image-capturing data (S13). It is assumed that the point cloud data including the point at which the likelihood is estimated substantially coincides with the region indicated by the estimation image-capturing data.

Next, the unifying unit 22 uses the point cloud likelihood estimation data to give the likelihood to each point included in the measurement 3D point cloud data (S14). The unifying unit 22 generates 3D point cloud data with confidence such that data with high accuracy is clearly distinguished from data with low accuracy.

As described above, the information processing device 20 can estimate the likelihood of each point included in the estimation 3D point cloud data determined based on substantially the same region as the estimation image-capturing data, from the estimation image-capturing data. For this reason, the information processing device 20 can determine the accuracy of each point included in the measurement 3D point cloud data acquired by the LIDAR sensor 21, using the estimated likelihood of each point. A user or an administrator, who operates the information processing device 20, can use the information on the accuracy or confidence of the measurement 3D point cloud data acquired by the LIDAR sensor 21 to correct data loss or data with low confidence. As a result, the information processing device 20 can perform robust sensing against disturbances caused by particles such as rain, snow, and dust flying into air.

Further, it is possible to improve the accuracy of a 3D map, obstacle information, or road surface information using the 3D point cloud data with confidence.

Third Example Embodiment

Figure 6:
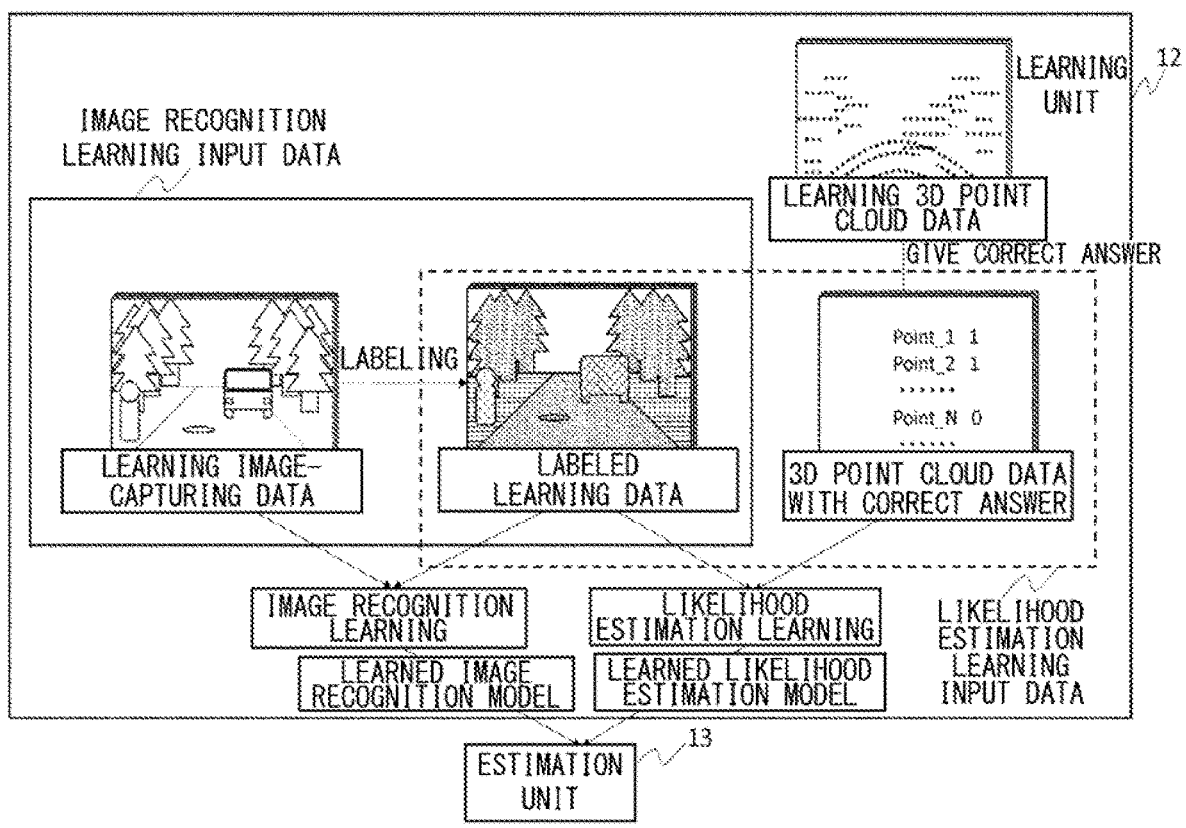
FIG. 6 is a view illustrating an outline of a learning process according to a third example embodiment.

Subsequently, a learning process according to a third example embodiment will be described with reference to FIG. 6. Also in the third example embodiment, the process using the information processing device 20 shown in FIG. 2 is executed. FIG. 6 shows that the learning unit 12 performs image recognition learning and likelihood estimation learning. The image recognition learning shows that a model (hereinafter, referred to as a learned image recognition model) used for image recognition is generated using learning image-capturing data and labeled learning data. In addition, the likelihood estimation learning shows that a model (hereinafter, referred to as a learned likelihood estimation model) used for likelihood estimation is generated using the labeled learning data and 3D point cloud data with correct answer.

The label may be, for example, the name of each object displayed in the learning image-capturing data. For example, in the labeled learning data, labels of a person, a car, a tree, and a puddle may be given to respective objects.

Further, in the labeled learning data, a different color may be given to each of the labeled objects and the difference from other objects may be clarified. As for the labeled learning data, labels of a person, a car, a tree, and a puddle are used as correct answer data when the learned image recognition model is generated. As an image recognition process, for example, semantic segmentation may be executed. In other words, the learned image recognition model may be a model used for semantic segmentation.

The learned image recognition model may be a model used to generate labeled estimation data from the estimation image-capturing data acquired by the image-capturing sensor 11. Further, the learned likelihood estimation model may be a model used to estimate likelihood of a point corresponding to the labeled estimation data out of respective points in the estimation 3D point cloud data, from the labeled estimation data. In other words, the learned likelihood estimation model may be a model used to generate, from the labeled estimation data, two-dimensional image data (hereinafter, referred to as likelihood estimation image data) that distinguishes an object in which the likelihood is set to 1 and an object in which the likelihood is set to 0. For example, in the likelihood estimation image data, different colors may be given to the position of the puddle and other positions in order to show that the likelihood is set 0 at the position of the puddle and the likelihood is set to 1 at other positions. Further, the value set as the likelihood may be any value indicating a value between 0 and 1.

Figure 7:
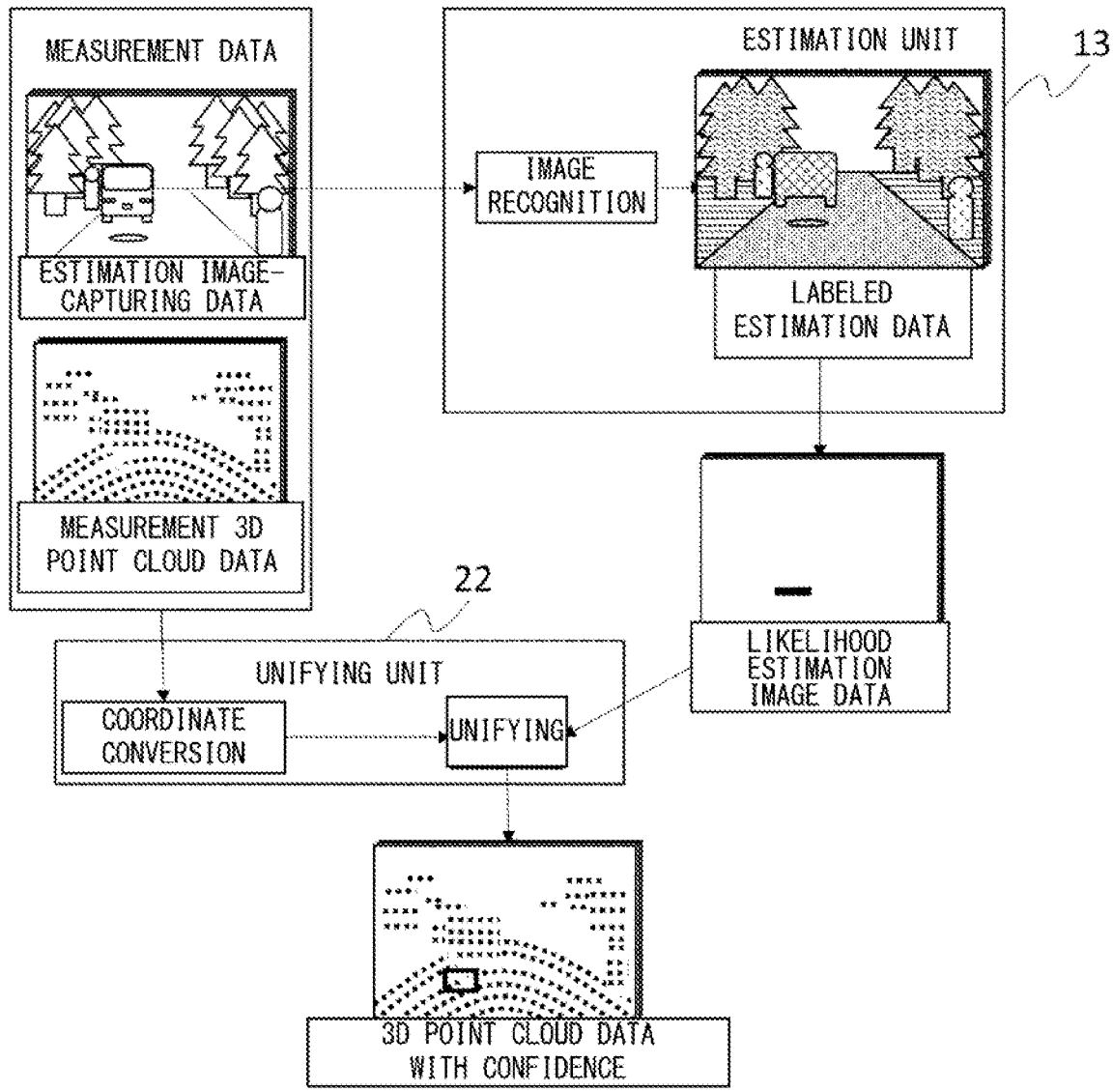
FIG. 7 is a view illustrating an outline of a unifying process according to the third example embodiment.

Subsequently, a unifying process executed in the unifying unit 22 will be described with reference to FIG. 7. The estimation unit 13 performs an image recognition process using the estimation image-capturing data acquired by the image-capturing sensor 11, and generates labeled estimation data as an image recognition result. Specifically, the estimation unit 13 uses the learned image recognition model to generate labeled estimation data from the estimation image-capturing data. Further, the estimation unit 13 uses the learned likelihood estimation model to generate likelihood estimation image data from the labeled estimation data. The labeled estimation data input to the learned likelihood estimation model is the labeled estimation data generated using the learned image recognition model.

Figure 8:
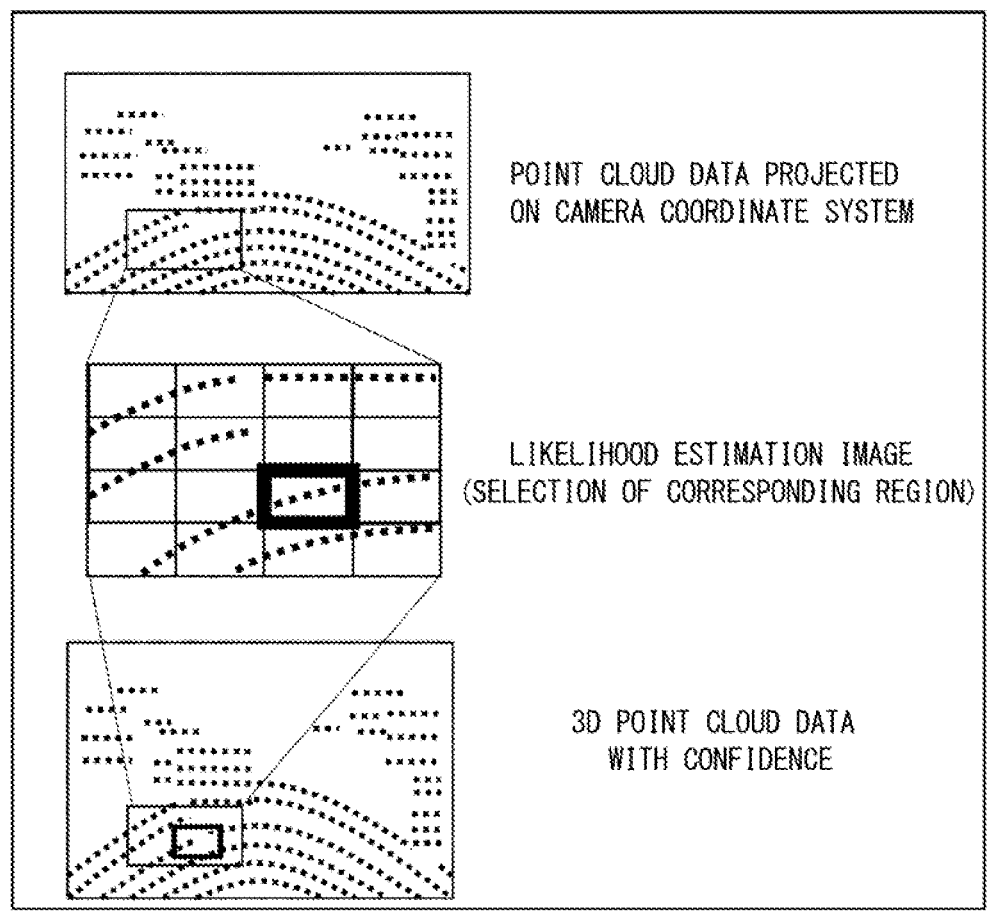
FIG. 8 is a view illustrating details of the unifying process according to the third example embodiment.

A detailed process in the unifying unit 22 shown in FIG. 7 will be described below with reference to FIG. 8. The unifying unit 22 converts the measurement 3D point cloud data acquired by the LIDAR sensor 21 into point cloud data projected on the camera coordinate system. In other words, the unifying unit 22 performs coordinate conversion on the measurement 3D point cloud data acquired by the LIDAR sensor 21, and generates two-dimensional point cloud data.

Further, the unifying unit 22 gives likelihood to each point in the two-dimensional point cloud data using the likelihood estimation image data which is two-dimensional data. Further, the unifying unit 22 performs coordinate conversion of the two-dimensional point cloud data, to which the likelihood is given, into 3D point cloud data, and generates 3D point cloud data with confidence.

In the third example embodiment, as described above, the information processing device 20 performs learning to generate the learned image recognition model for executing the image recognition process and the learned likelihood estimation model for performing the likelihood estimation. Further, the information processing device 20 can generate the 3D point cloud data with confidence using the likelihood estimation image data obtained when the labeled estimation data generated using the learned image recognition model is used as an input of the learned likelihood estimation model.

By executing semantic segmentation as an image recognition process, the information processing device 20 can extract an image of a puddle from various states of a puddle that can be included in the image-capturing data for imaging, for example. On the other hand, in order to extract a puddle without using semantic segmentation, it is necessary to learn various states of a puddle and to determine a learning model for extracting the puddle. In other words, using the semantic segmentation as the image recognition process, it is possible to easily distinguish between a puddle in which the likelihood of the distance should be set to 0 and other objects. As a result, a desired learned model can be determined using a smaller number of labeled learning data than the number of learning image-capturing data when the image-capturing data is used as the learning data.

In addition, by the estimation process using the learned image recognition model and the learned likelihood estimation model, for example, only one of the learned image recognition model and the learned likelihood estimation model can be replaced with a model having high recognition accuracy.

In the third example embodiment, the case has been described in which the learning unit 12 performs the image recognition learning and the likelihood estimation learning, but, for example, the learning unit 12 may perform only the learning using the learning image-capturing data and the 3D point cloud data with correct answer. In other words, the learning unit 12 may generate a model used to generate the likelihood estimation image from the estimation image-capturing data without performing the learning using the labeled learning data. In this case, the estimation unit 13 does not perform the image recognition shown in FIG. 7, but inputs the estimation image-capturing data to the learned model generated by the learning unit 12 to generate the likelihood estimation image data.

As described above, the processing load in the estimation unit 13 can be reduced using only one learned model as compared with the case where two learned models are used.

Fourth Example Embodiment

Subsequently, a correcting process according to a fourth example embodiment will be described. In the fourth example embodiment, a description will be given with respect to a case where the likelihood estimation result is corrected according to the installation position of the LIDAR sensor 21. For example, it is assumed that the smaller the incident angle of the light irradiated from the LIDAR sensor 21 with respect to the ground surface, the smaller the intensity of the reflected light. For this reason, as the incident angle of the light irradiated from the LIDAR sensor 21 with respect to the ground surface becomes smaller, the weighting value for setting the likelihood of the distance to 1 may be made smaller. In other words, as the incident angle of the light irradiated from the LIDAR sensor 21 with respect to the ground surface becomes smaller, the number of points where the likelihood is set to 0 increases. As for the incident angle of the light irradiated from the LIDAR sensor 21, the incident angle with respect to the ground surface becomes smaller as the mounting angle of the LIDAR sensor 21 faces upward with respect to the ground surface.

Further, it is assumed that the higher the installation position of the LIDAR sensor 21 away from the ground surface, the longer the distance from the ground surface to the LIDAR sensor 21, and the lower the intensity of the reflected light. Therefore, for example, when the incident angles are equal to each other, the higher the installation position of the LIDAR sensor 21 away from the ground surface, the smaller the weighting value for setting the likelihood of the distance to 1. In other words, among the plurality of LIDAR sensors 21 having the same incident angle, as the installation position of the LIDAR sensor 21 becomes higher away from the ground surface, the number of points where the likelihood is set to 0 increases.

As described above, the information processing device 20 can correct the estimated likelihood of the distance between the points according to at least one of the incident angle of laser beams irradiated from the LIDAR sensor 21 with respect to the ground surface and the height of the LIDAR sensor 21 from the ground surface.

It is possible to set the likelihood of each point with higher accuracy by changing the weighting coefficient used to determine the likelihood according to the installation position of the LIDAR sensor 21.

Figure 9:
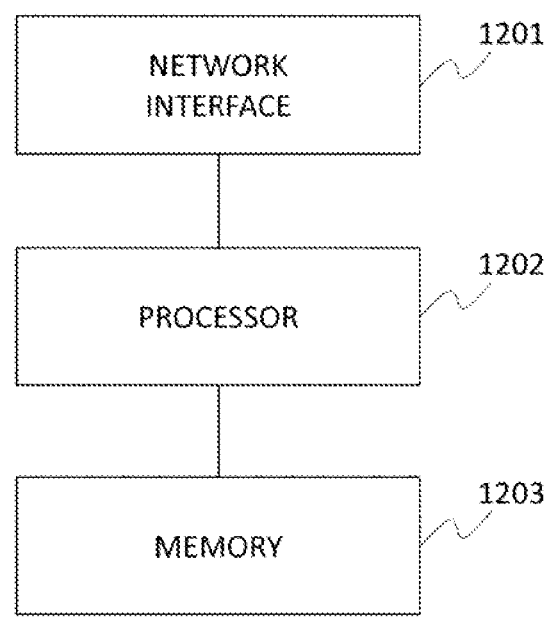
FIG. 9 is a block diagram of the information processing device according to each of the example embodiments.

FIG. 9 is a block diagram showing a configuration example of the information processing device 10 or the information processing device 20 (hereinafter, referred to as the information processing device 10). Referring to FIG. 9, the information processing device 10 includes a network interface 1201, a processor 1202, and a memory 1203. The network interface 1201 is used to communicate with a network node (e.g., eNB, MME, P-GW). The network interface 1201 may include, for example, a network interface card (NIC) conforming to the IEEE 802.3 series.

The processor 1202 reads software (computer program) from the memory 1203 and executes the software to perform the process of the information processing device 10 described using the flowchart in the above-described example embodiments. The processor 1202 may be, for example, a microprocessor, MPU, or CPU. The processor 1202 may include a plurality of processors.

The memory 1203 is made up of a combination of a volatile memory and a nonvolatile memory. The memory 1203 may include a storage arranged away from the processor 1202. In this case, the processor 1202 may access the memory 1203 through an I/O interface (not shown).

In the example of FIG. 9, the memory 1203 is used to store software modules. The processor 1202 can read and execute these software modules from the memory 1203 to perform the process of the information processing device 10 described in the above-described example embodiments.

As described with reference to FIG. 9, each of the processors included in the information processing device 10 in the above-described example embodiments executes one or a plurality of programs including instructions for causing a computer to perform the algorithm described with reference to the drawings.

In the above example, these programs may be stored in various types of non-transitory computer readable media and thereby supplied to computers. The non-transitory computer readable media includes various types of tangible storage media. Examples of the non-transitory computer readable media include a magnetic recording medium (for example, a flexible disk, a magnetic tape, and a hard disk drive), a magneto-optic recording medium (for example, a magneto-optic disk), a CD-ROM (Read Only Memory), a CD-R, a CD-R/W, and a semiconductor memory (a mask ROM, a PROM (Programmable ROM), an EPROM (Erasable PROM), a flash ROM, and a RAM (Random Access Memory)). These programs may be supplied to computers using various types of transitory computer readable media. Examples of the transitory computer readable media include an electrical signal, an optical signal, and an electromagnetic wave. The transitory computer readable media can supply programs to a computer through a wired communication line, for example, electric wires and optical fibers, or a wireless communication line.

The present invention is not limited to the embodiments described above, and can be appropriately modified without departing from the gist.

Some or all of the above-described example embodiments may also be described as Supplementary notes to be described below, but are not limited thereto.

(Supplementary Note 1)

An information processing device including:
an image-capturing sensor;
a learning unit configured to learn, as learning data, learning image-capturing data and likelihood of a distance between points included in 3D point cloud data with correct answer in a region substantially the same region included in the learning image-capturing data, and to generate a learned model; and
an estimation unit configured to use the learned model to generate estimation data including likelihood of a distance between points included in estimation 3D point cloud data determined based on estimation image-capturing data, from the estimation image-capturing data acquired by the image-capturing sensor.

(Supplementary Note 2)

In the information processing device according to Supplementary note 1, the learning unit is configured to manage a correspondence relation between the points included in the 3D point cloud data with correct answer and positions corresponding to pixels of the learning image-capturing data.

(Supplementary Note 3)

In the information processing device according to Supplementary note 1 or 2, the likelihood of the distance between the points included in the 3D point cloud data with correct answer is determined according to a result of comparison with a distance between surrounding points.

(Supplementary Note 4)

In the information processing device according to any one of Supplementary notes 1 to 3, the information processing device further includes:
an LIDAR sensor; and
a unifying unit configured to give likelihood of a distance between points included in the estimation data to each of points in measurement 3D point cloud data acquired by the LIDAR sensor.

(Supplementary Note 5)

In the information processing device according to Supplementary note 4, the measurement 3D point cloud data includes substantially the same region as a region included in the estimation image-capturing data.

(Supplementary Note 6)

In the information processing device according to any one of Supplementary notes 1 to 5,
the learning unit is configured to use, as learning data, the learning image-capturing data, the labeled learning data, and the likelihood of the distance between the points included in the 3D point cloud data with correct answer, and
the estimation unit is configured to generate likelihood estimation image data as the estimation data from labeled estimation data obtained by performing image processing on the estimation image-capturing data.

(Supplementary Note 7)

In the information processing device according to Supplementary note 6, the estimation unit is configured to execute semantic segmentation as the image processing.

(Supplementary Note 8)

In the information processing device according to any one of Supplementary notes 4 to 7, the estimation unit is configured to correct the likelihood of the distance between the points generated from the estimation image-capturing data according to at least one of an incident angle of laser beams irradiated from the LIDAR sensor with respect to a ground surface and a height of the LIDAR sensor from the ground surface.

(Supplementary Note 9)

A data generation method including:
learning, as learning data, learning image-capturing data and likelihood of a distance between points included in 3D point cloud data with correct answer in a region substantially the same region included in the learning image-capturing data, and generating a learned model; and using the learned model to generate estimation data including likelihood of a distance between points included in estimation 3D point cloud data determined based on estimation image-capturing data, from the estimation image-capturing data acquired by the image-capturing sensor.

(Supplementary Note 10)

A program for causing a computer to execute:

a process of learning, as learning data, learning image-capturing data and likelihood of a distance between points included in 3D point cloud data with correct answer in a region substantially the same region included in the learning image-capturing data, and generating a learned model; and a process of using the learned model to generate estimation data including likelihood of a distance between points included in estimation 3D point cloud data determined based on estimation image-capturing data, from the estimation image-capturing data acquired by the image-capturing sensor.

Although the present invention has been described above with reference to the example embodiment, the present invention is not limited the above-described example embodiments. Various modifications that can be understood by those skilled in the art can be made to the configuration and details of the present invention within the scope of the present invention.

This application is based upon and claims the benefit of priority from Japanese Patent Application No. 2019-134718, filed Jul. 22, 2019, the entire contents of which are incorporated herein by reference.

REFERENCE SIGNS LIST

10 INFORMATION PROCESSING DEVICE
11 IMAGE-CAPTURING SENSOR
12 LEARNING UNIT
13 ESTIMATION UNIT
20 INFORMATION PROCESSING DEVICE
21 LIDAR SENSOR
22 UNIFYING UNIT

What is claimed is:

1. An information processing device comprising:
an image-capturing sensor;
at least one memory storing instructions; and
at least one processor configured to execute the instructions to:
determine learning image-capturing data of 3D point cloud data and a correct answer of a distance of points included in the 3D point cloud data;
generate a model, based on the learning image-capturing data, that estimates a likelihood of a distance of the points included in 3D point cloud data for a region in input image-capturing data that is substantially the same as a region included in the learning image-capturing data, the likelihood of the distance of the points representing an accuracy of the distance of the points in the 3D point cloud data;
generate estimation data including the likelihood of a the distance of the points included in the 3D point cloud data that is determined based on estimation image-capturing data, by inputting the estimation image-capturing data acquired by the image-capturing sensor to the learned model; and
providing the likelihood of the distance of the points included in the estimation data to each of the points in the 3D point cloud data as measured and acquired by a LIDAR sensor.

2. The information processing device according to claim 1, wherein the at least one processor is further configured to execute the instructions to manage a correspondence relation between the points included in the 3D point cloud data with the correct answer and positions corresponding to pixels of the learning image-capturing data.

3. The information processing device according to claim 1, wherein the likelihood of the distance of the points included in the 3D point cloud data is determined according to a result of comparison with a distance of surrounding points.

4. The information processing device according to claim 1, wherein the 3D point cloud data as measured and acquired by the LIDAR sensor includes substantially the same region as a region in the estimation image-capturing data.

5. The information processing device according to claim 1, wherein the at least one processor is further configured to execute the instructions to
generate likelihood estimation image data as the estimation data from labeled estimation data obtained by performing image processing on the estimation image-capturing data.

6. The information processing device according to claim 5, wherein the at least one processor is further configured to execute the instructions to execute semantic segmentation as the image processing.

7. The information processing device according to claim 1, wherein the at least one processor is further configured to execute the instructions to correct the likelihood of the distance of the points generated from the estimation image-capturing data according to at least one of an incident angle of laser beams irradiated from the LIDAR sensor with respect to a ground surface and a height of the LIDAR sensor from the ground surface.

8. A data generation method performed by a computer and comprising:
determining learning image-capturing data of 3D point cloud data and a correct answer of a distance of points included in the 3D point cloud data;
generating a model, based on the learning image-capturing data, that estimates a likelihood of a distance of the points included in 3D point cloud data for a region in input image-capturing data that is substantially the same as a region included in the learning image-capturing data, the likelihood of the distance of the points representing an accuracy of the distance of the points in the 3D point cloud data;
generating estimation data including the likelihood of a the distance of the points included in the 3D point cloud data that is determined based on estimation image-capturing data, by inputting the estimation image-capturing data acquired by the image-capturing sensor to the learned model; and
providing the likelihood of the distance of the points included in the estimation data to each of the points in the 3D point cloud data as measured and acquired by a LIDAR sensor.

9. A non-transitory computer-readable medium storing a program executable by a computer to perform processing comprising:
determining learning image-capturing data of 3D point cloud data and a correct answer of a distance of points included in the 3D point cloud data;

generating a model, based on the learning image-capturing data, that estimates a likelihood of a distance of the points included in 3D point cloud data for a region in input image-capturing data that is substantially the same as a region included in the learning image-capturing data, the likelihood of the distance of the points representing an accuracy of the distance of the points in the 3D point cloud data;

generating estimation data including the likelihood of a the distance of the points included in the 3D point cloud data that is determined based on estimation image-capturing data, by inputting the estimation image-capturing data acquired by the image-capturing sensor to the learned model; and providing the likelihood of the distance of the points included in the estimation data to each of the points in the 3D point cloud data as measured and acquired by a LIDAR sensor.

* * * * *